United States Patent [19]
Kawai

[11] 4,438,487
[45] Mar. 20, 1984

[54] DIGITAL PHASE-SHIFTING CIRCUIT

[75] Inventor: Jyoji Kawai, Hyogo, Japan

[73] Assignee: Mitsubishi Denki Kabushiki Kaisha, Tokyo, Japan

[21] Appl. No.: 389,066

[22] Filed: Jun. 16, 1982

[30] Foreign Application Priority Data

Aug. 19, 1981 [JP] Japan .................................. 56-169876

[51] Int. Cl.³ .......................................... H02M 7/155
[52] U.S. Cl. ................................. 363/129; 307/252 P; 363/87
[58] Field of Search ........... 307/252 N, 252 P, 252 Q; 363/87, 129

[56] References Cited

U.S. PATENT DOCUMENTS

| | | | |
|---|---|---|---|
| 3,735,241 | 5/1973 | O'Sullivan | 307/252 Q X |
| 4,173,722 | 11/1979 | Detering | 307/252 Q |
| 4,309,749 | 1/1982 | Weibelzahl et al. | 307/252 Q X |
| 4,394,723 | 7/1983 | Hoffman | 363/87 |

Primary Examiner—William M. Shoop
Attorney, Agent, or Firm—Bernard, Rothwell & Brown

[57] ABSTRACT

A digital phase-shifting circuit employed for a thyristor converter, which operates on a polyphase power supply. In the digital phase-shifting circuit which is simply constructed as a whole, a counter portion consists of an N-bit binary counter and a divide-by-six ring counter, and a comparator portion consists of a common comparator which compares data bits and simply constructed two-bit comparators that are provided for each of the phases.

7 Claims, 4 Drawing Figures

DIGITAL PHASE-SHIFTING CIRCUIT

BACKGROUND OF THE INVENTION

1. Field of the Invention

The present invention relates to a digital phase-shifting circuit for use in a thyristor converter.

2. Description of the Prior Art

The conventional digital phase-shifting circuit of this type can be represented by the one that is shown in FIG. 1.

That is, FIG. 1 shows the conventional thyristor converter and the digital phase-shifting circuit. The thyristor converter 7 consists of thyristors 1 to 6 that are connected to three phases U, V, W of an AC power supply and to DC voltage terminals P, N. A phase-shifting circuit 19 is corresponded to thyristors 1 and 4 among the above-mentioned thyristors. The phase-shifting circuit 19 includes a binary counter 10 which counts input clock signals 8 and which produces binary outputs 18. Here, the period of operation cycle of the binary counter 10 has been brought into agreement with the period of one phase of the three-phase AC power supply by a PLL (phase-locked loop) that is not shown.

A digital comparator 12 compares a striking phase reference (value of binary notation) of the thyristor with a binary output 11 consisting of bits which do not include the most significant bit among binary outputs of the binary counter 10, and produces an output 13 of the logical level "1" when values of bits 11 exceed the striking phase reference 40. A pulse circuit 14 connected to the digital comparator 12 generates a pulse responsive to the output of the digital comparator 12, and distributes the pulse to either an output terminal 16 or an output terminal 17 alternatingly responsive to a signal 15 consisting of the most significant bit among the binary outputs 18. The outputs 16 and 17 of the pulse circuit 14 are amplified to form striking signals TU, TX for the thyristors 1 and 4.

A phase-shifting circuit 29 also works to supply striking signals TZ, TW to the thyristors 2 and 5, and functions quite in the same manner as the phase-shifting circuit 19. The phase-shifting circuit 29, however, has a reset circuit 41 for resetting a binary counter 20, and produces a reset pulse at a moment when the binary output 18 of the counter 10 assumes an electric angle of 60°. The binary counter 20 is reset by the thus produced pulse.

A phase-shifting circuit 39 supplies striking signals TV, TY to the thyristors 3 and 6, and operates in the same manner as the above-mentioned phase-shifting circuit 19. A reset circuit 42, however, produces a pulse at a moment when the binary output 18 of the counter 10 assumes an electric angle of 120° to reset a binary counter 30.

Operation of the thus constructed conventional device will be described below.

Counter outputs 111 of FIG. 2 (a) represent, in an analog manner, binary outputs 11 (outputs excluding the most significant bit 15 among outputs 18 of all bits of the counter 10) of the binary counter 10 in the phase-shifting circuit 19. The counter output 111 repeats the counting-up after every electric angle of 180°. FIG. 2 (b) represents the output 15 consisting of the most significant bit of the binary counter 10, which is in synchronism with the period of the AC power supply.

Here, if the striking phase reference 40 is denoted by an analog quantity as shown in FIG. 2 (a), the counter output 111 crosses the phase reference 140 at phase moments of $\alpha_1$ and $\alpha_4$ in one cycle (i.e., in one cycle of the most significant bit 15) of the period of the power supply. At these moments, the digital comparator 12 produces output signals 13 to the pulse circuit 14 so that it will produce two pulses. These two pulses are distributed to the output terminal 16 and output terminal 17 by the signal 15 consisting of the most significant bit [FIG. 2 (b)], whereby output pulses TU, TX are prepared as shown in FIGS. 2 (c) and 2 (f), and are supplied as striking signals to the thyristors 1 and 4. The phase-shifting circuit 19 corresponding to the thyristors 1 and 4 operates as mentioned above. Phase-shifting circuits 29 and 39 corresponding to other thyristors 2, 5 and 3, 6, also, operate in the same manner as the above phase-shifting circuit 19. However, the binary counter 20 is reset by the reset circuit 41 at the moment when the output of the binary counter 10 assumes the electric angle of 60°. The binary counter 30 is also reset when the output of the binary counter 10 assumes the electric angle of 120°. Accordingly, outputs 21 and 31 of the counters 20, 30 assume patterns whose phases are deviated by 60° and 120° relative to the counter output 111 of the binary counter 10, as indicated by counter outputs 121, 131 in FIG. 2 (a). Final outputs 26, 27, 36, 37 become as indicated by (d), (g), (e) and (h) in FIG. 2; i.e., striking signals are produced for the thyristors 2, 5, 3 and 6.

According to the conventional art, therefore, the digital phase-shifting circuit device needs one complete circuit for each phase, i.e., needs three complete circuits. That is, six circuits are required when the phase-shifting circuit device is to be adapted to a six-phase power supply.

In the conventional device, furthermore, if the number of bits of binary counters is increased to increase the resolution for the phases, increased number of parts must be used for the counters and comparators of each circuit, resulting in the complicated setup and increased manufacturing cost.

In order to preclude the above-mentioned defects, the object of the present invention is to provide a digital phase-shifting circuit in which the number of counts of the counter is selected to be $6 \times 2^N$ (N is a given number) within a period of 360°, and counters and a comparator are commonly utilized in the phase-shifting circuit, in an attempt to reduce the number of parts.

DESCRIPTION OF THE PREFERRED EMBODIMENT

Figure 3:
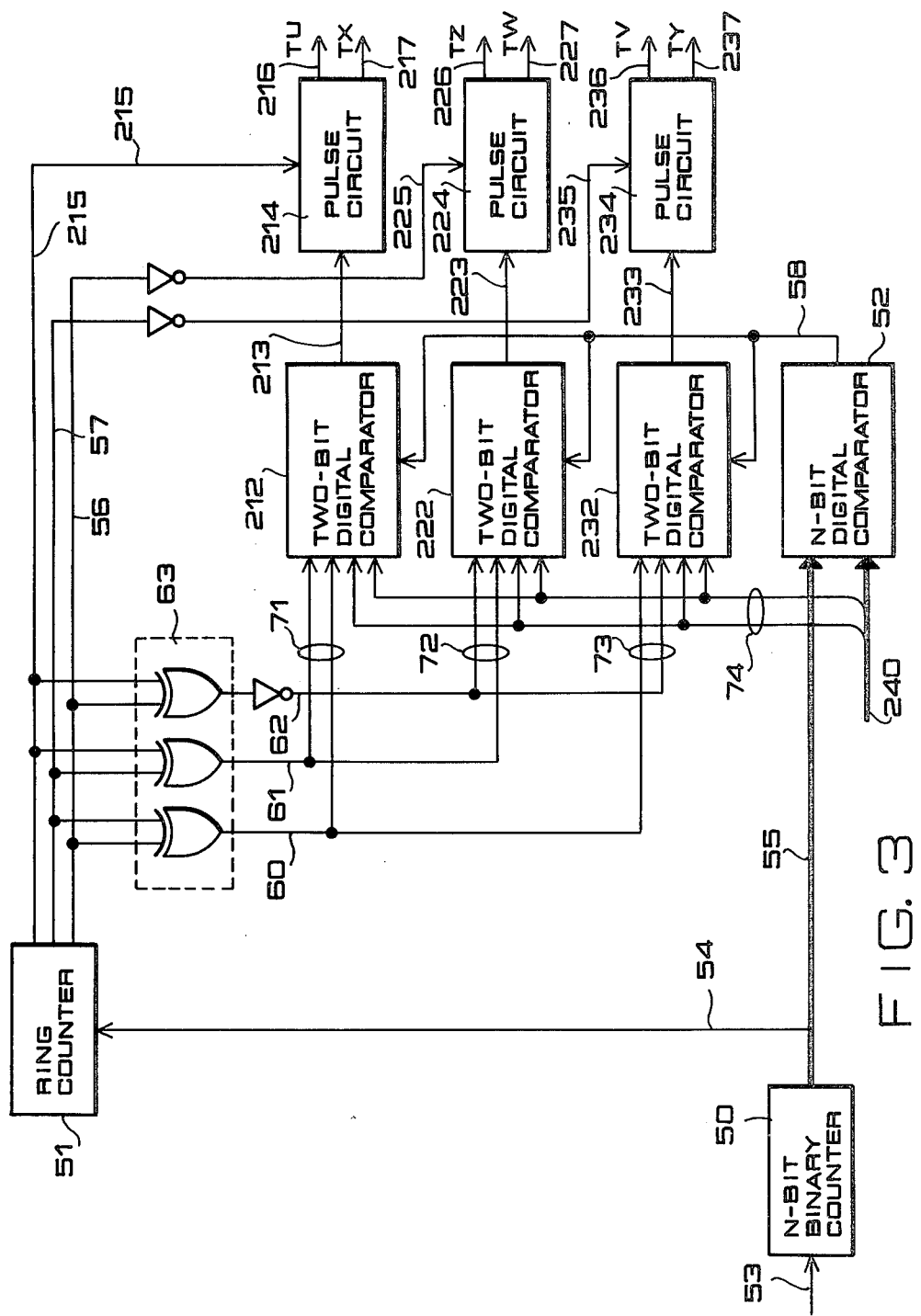
FIG. 3 is a block diagram of a digital phase-shifting circuit according to an embodiment of the present invention.

FIG. 3 shows a digital phase-shifting circuit according to an embodiment of the present invention, in which an N-bit binary counter 50 is actuated by clock pulses 53, and produces a binary output 55 consisting of N bits to an N-bit digital comparator 52. Among the N-bit outputs 55 of the N-bit binary counter 50, a signal 54 consisting of the most significant bit drives a divide-by-six ring counter 51 which produces three output signals 215, 56 and 57. The N-bit digital comparator 52 receives a phase reference signal 240 in addition to the binary output 55 consisting of N bits, and compares the output 55 with less significant N bits among N+2 bits of the phase reference signal 240 which does not contain more significant 2 bits, and sends a logic output 58 to two-bit digital comparators 212, 222 and 232 when the value indicated by the binary output 55 consisting of N bits has exceeded the value indicated by less significant N bits of the phase reference signal 240. For instance, the digital comparator 212 receives, as a signal 71 consisting of a set of two binary bits, an output 60 of exclusive OR gate 63 which receives outputs 56, 57 of the divide-by-six ring counter 51, and an output signal 61 of exclusive OR gate 63 which receives outputs 57, 215 of the divide-by-six ring counter 51, and further receiving more significant 2 bits of phase reference signal 240 as the other pair of binary 2 bit signal 74. When the binary two-bit signal 71 is greater than the other binary two-bit signal 74, or when they are equal and the logic output 58 is fed, the two-bit digital comparator 212 produces a logic signal 213.

Another two-bit digital comparator 222 receives two output signals 61, 62 of the exclusive OR gate 63 as a signal 72 consisting of two binary bits, and further receives another binary two-bit signal 74 which consists of a set of two binary bits. When the signal 72 is greater than the signal 74, or when they are equal and the signal 58 is fed, the comparator 222 produces a logic output signal 223.

The remaining two-bit digital comparator 232 also receives signals 73 and 74 each consisting of a set of two binary bits. When the signal 73 is greater than the signals 74, or when they are the same and the signal 58 is fed, the comparator 232 produces a logic output signal 233.

Figure 1:
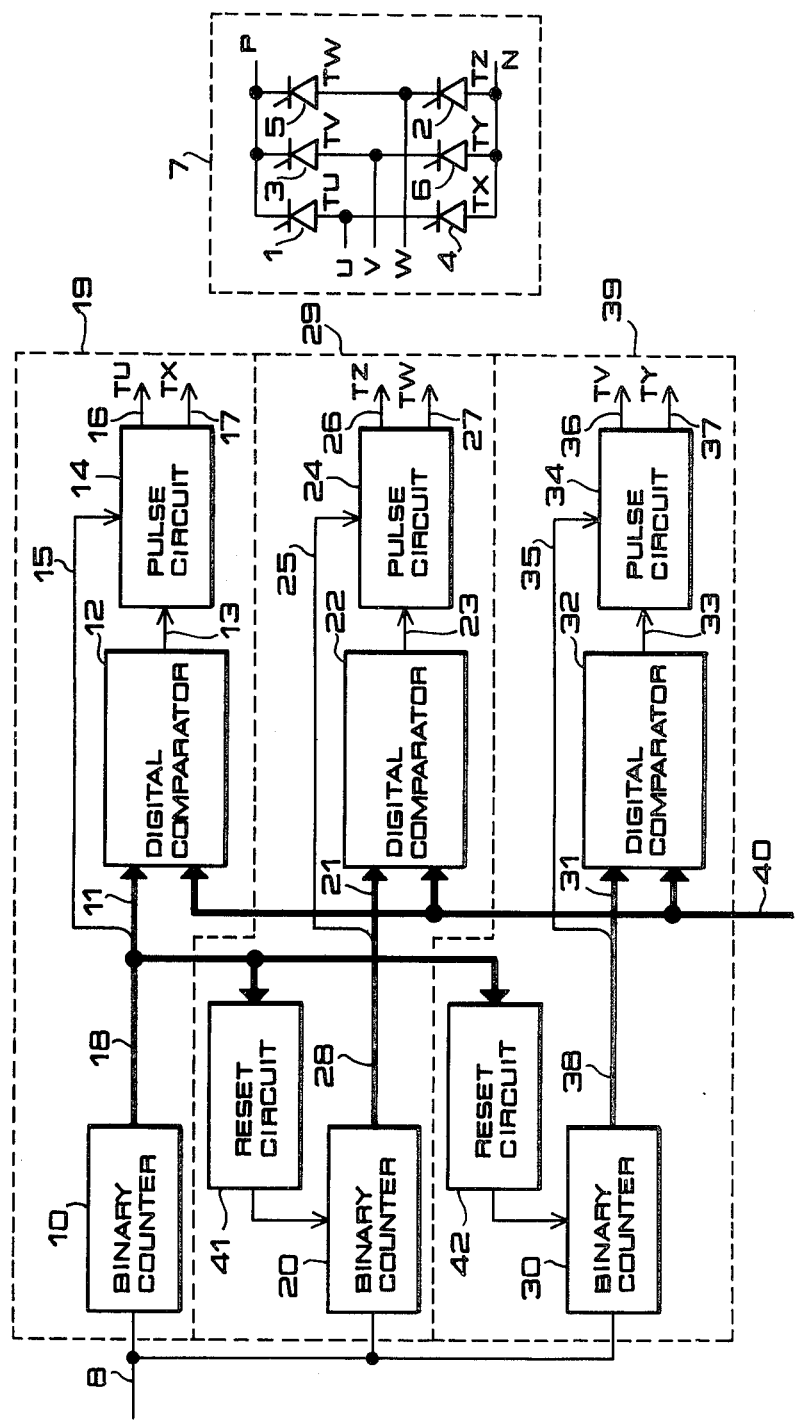
FIG. 1 is a block diagram showing a conventional digital phase-shifting circuit.

Outputs 213, 223 and 233 of the comparators 212, 222 and 232 are sent to pulse circuits 214, 224 and 234, respectively. The pulse circuits 214, 224 and 234 are constructed in the same manner as the pulse circuits 14, 24 and 34 of FIG. 1, and produce pulse signals upon receipt of input signals 213, 223 and 233. The pulse produced by the pulse circuit 214 is fed to either a terminal 216 or a terminal 217 responsive to the signal 215 from the divide-by-six counter 51. The pulse produced by the pulse circuit 224 is also fed to either a terminal 226 or a terminal 227 responsive to the signal 225 from the divide-by-six ring counter 51. The pulse produced by the pulse circuit 234 is fed to either a terminal 236 or a terminal 237 responsive to the signal 235 from the divide-by-six ring counter 51. Output signals 216, 217, 226, 227, 236 and 237 from the pulse circuits 214, 224 and 234 are amplified, and are utilized as striking signals for the thyristors of the thyristor converter 7 which is shown in FIG. 1.

Operation of the digital phase-shifting circuit of FIG. 3 will be illustrated below in conjunction with a waveform diagram of FIG. 4.

The N-bit binary counter 50 performs the counting operation relying upon the clock pulses 53 as mentioned earlier. The N-bit binary counter 50 operates at the break of the most significant bit 54 shown in FIG. 4 (a) in the output 55 of the N-bit binary counter 50, and produces outputs 56, 57 and 215 as shown in FIGS. 4 (b), 4 (c) and 4 (d). Owing to the PLL circuit (not shown), the two counters 50, 51 are in synchronism with the AC power supply, and period of each of the outputs of the divide-by-six ring counter 51 is in agreement with the period of the AC power supply. That is, the output of the divide-by-six ring counter 51 successively changes after every 60°. The N-bit binary counter 50 repeats the counting-up until $2^N$ after every 60°.

Figure 2:
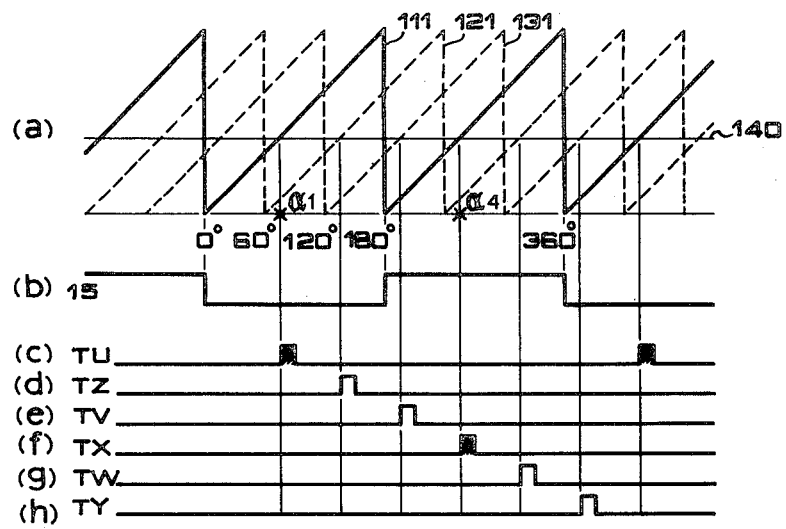
FIG. 2 is a diagram of signal waveforms at major portions of FIG. 1.

Upon receipt of outputs 56, 57 and outputs 57, 215 of the divide-by-six counter 51, the exclusive OR gate 63 produces outputs 60 and 61. Further, upon receipt of outputs 56 and 215, the exclusive OR gate 63 produces an inverted signal 62. As indicated by (e), (f) and (g) in FIG. 4, therefore, the signals 60, 61 and 62 assume a width of 60° each having a phase difference of 60° relative to each other. Here, the two-bit signal 71 consists of the output 60 as a less significant bit and the output 61 as a more significant bit, which are produced by the exclusive OR gate 63. The signal 71 then assumes a binary value "0" over a period of 0° to 60°, assumes a binary value "1" over a period of 60° to 120°, and assumes a binary value "2" over a period of 120° to 180°; these states are repeated every after 180°. Here, the two-bit signal 71 is added to the output consisting of N bits produced by the binary counter 50, to obtain a signal consisting of N+2 bits. If represented in an analog manner, the signal assumes a waveform denoted by 311 in FIG. 4 (b), which performs the counting-up until $2^N \times 3$ after every 180°. Further, if indicated in an analog manner using a phase reference signal 240 consisting of N+2 bits as a phase reference level 340 in FIG. 4 (h), the relation between the phase reference level 340 and the signal 311 becomes the same as the relation between the phase reference level 140 and the signal 111 in FIG. 2 (a).

Figure 4:
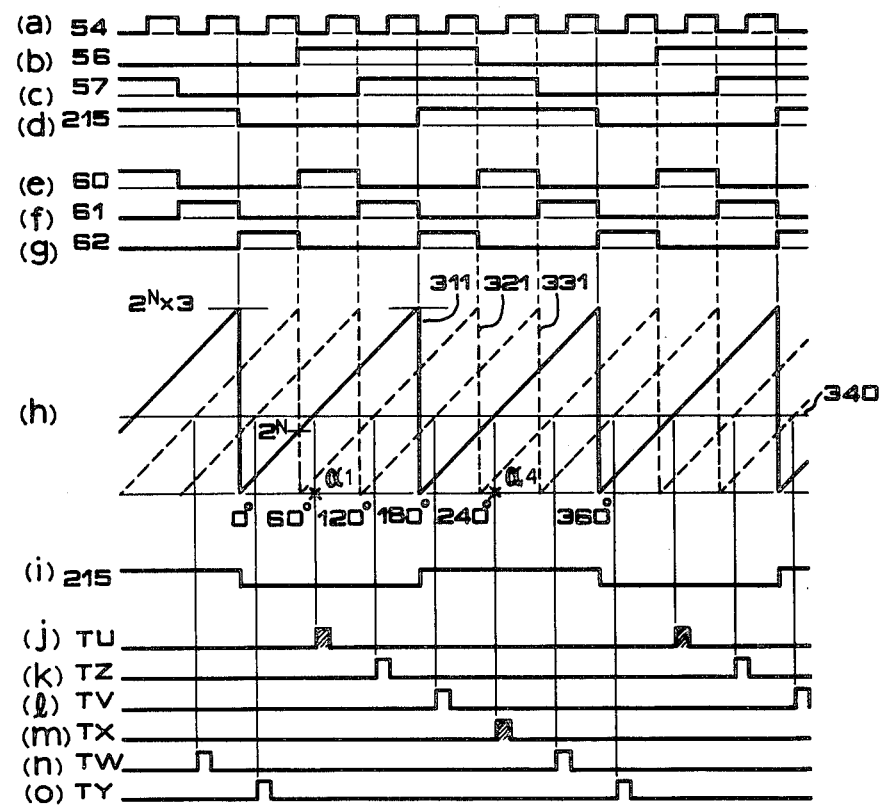
FIG. 4 is a diagram showing signal waveforms at major portions of FIG. 3.

The waveform of signal of FIG. 4 (d), i.e., the signal 215 of FIG. 3, is shown again in FIG. 4 (i). That is, it will be understood that the signal 215 of FIG. 3 has the same relation as the signal 15 of FIG. 1.

Here, the two-bit digital comparator 212 and N-bit digital comparator 52 of FIG. 3 compare the waveform 311 with the phase reference level 340, which are shown in FIG. 4 (h). That is, the two-bit digital comparator 212 compares the signal 71 which consists of two more significant bits in the signal 311 consisting of N+2 bits with the signal 74 which consists of two more significant bits in the phase reference signal 240 consisting of N+2 bits. When the signal 71 is greater than the signal 74, the digital comparator 212 produces a logic output 213. In the case when the binary two-bit signals 71 and 74 are equal to each other, the two-bit digital comparator 212 produces a logic output 213 all the time when the N-bit digital comparator 52 is producing a logic output 58, i.e., produces the logic output 213 all the time when the signal 55 consisting of less significant N bits in the signal 311 is greater than the signal consisting of less significant N bits in the phase reference signal 240. Therefore, the two comparators 212 and 52 operate in the same manner as the comparator 12 of FIG. 1, and the output signal 213 becomes the same as the output signal 13 of FIG. 1.

Furthermore, the output signal 215 of the divide-by-six ring counter 51 is the same as the output signal 15 of the binary counter 10 of FIG. 1. Hence, by using a pulse circuit 214 which is constructed in the same manner as the pulse circuit 14 of FIG. 1, it is possible to obtain outputs 216, 217 which are the same as the signals 16, 17 of FIG. 1, as shown in FIGS. 4 (j) and 4 (m). Next, the two-bit signal 72 may consist of the signal 61 as a less significant bit and the signal 62 as a more significant bit.

The signal 72 assumes a binary value "0" over the period of 60° to 120°, a binary value "1" over the period of 120° to 180°, and a binary value "2" over the period of 180° to 240°; these states are repeated after every 180°. Therefore, the signal 72 comes into agreement with the signal 71 which is delayed by 60°. The two-bit signal 72 is added to the output consisting of N bits produced by the N-bit binary counter 50 to obtain a signal consisting of N+2 bits. If represented in an analog manner, the signal assumes a waveform 321 which is quite similar to the waveform 311, but is delayed by 60° in FIG. 4 (h). Therefore, if the waveform 321 is compared with the phase reference level 340 by the combination of two-bit digital comparator 222 and N-bit digital comparator 52, the operation is quite the same as the digital comparator 22 of FIG. 1. It will therefore be obvious that the two-bit digital comparator 222 produces the same output signal as that of the binary digital comparator 22 of FIG. 1. An inverted signal 225 of output signal 56 from the divide-by-six ring counter 51 is also in agreement with a signal in which the phase of signal 215 [FIG. 4 (i)] is delayed. Accordingly, the input signal 225 fed to a pulse circuit 224 is in agreement with the input signal 25 that is fed to the pulse circuit 24 of FIG. 1. Here, by using the pulse circuit 224 which is constructed in the same manner as the pulse circuit 24 of FIG. 1, the outputs 226, 227 become the same as the outputs 26, 27 of the pulse circuit 24 of FIG. 1. The signal 73 consisting of two bits, i.e., consisting of the inverted signal 62 as a less significant bit and the signal 60 as a more significant bit, exhibits a binary value "0" over a period of 120° to 180°, a binary value "1" over a period of 180° to 240°, and a binary value "2" over a period of 240° to 300°; these states are repeated after every 180°. The signal 73 therefore is in agreement with the signal 71 but is delayed by 120°. The signal 73 consisting of two bits is added to the output 55 consisting of N bits of the N-bit binary counter 50 to obtain a signal consisting of N+2 bits. If represented in an analog manner, the signal assumes a waveform 331 which is quite similar to the waveform 311, but is delayed by 120° as shown in FIG. 4 (h). Therefore, if the waveform 331 is compared with the phase reference level 340 by the combination of two-bit digital comparator 232 and N-bit digital comparator 52, the operation is quite the same as that of the binary digital comparator 32 of FIG. 1. Namely, the output signal 233 of the two-bit comparator 232 is in agreement with the signal 33 of FIG. 1. An inverted signal 235 of output signal 57 from the divide-by-six ring counter 51 is also in agreement with a signal in which the phase of signal 215 [FIG. 4 (i)] is delayed by 120°. The signal 235 is further in agreement with the signal 35 (FIG. 1). Here, by using a pulse circuit 234 which is constructed in the same manner as the pulse circuit 34 of FIG. 1, the outputs 236, 237 become the same as the outputs 36, 37 of the pulse circuits 34 of FIG. 1. Thus, the digital phase-shifting circuit which is constructed as shown in FIG. 3 according to the present invention, produces quite the same output signals as those of the circuit of FIG. 1.

Further a group of circuits comprising EX-OR gate 63 and two bit comparators 212, 222 and 232 directly define the relation between inputs and outputs since the circuits do not include any memory elements such as flip-flops, counters. Therefore the group of the circuits may be replaced by a single semiconductor ROM (read only memory).

In other words, use is made of a ROM in which signals 215, 56, 57, 74 and 58 as inputs and of signals 213, 223, and 233 as outputs, the ROM memorizing output patterns corresponding to input ones so as to effect the same functions as those of the group of the circuits. Furthermore it is possible to contain pulse circuits 214, 224 and 234 in the ROM.

In the digital phase-shifting circuit of the present invention as mentioned above, only one set of N-bit binary counter 50 and divide-by-six ring counter 51 suffices for the requirement. Therefore, the counter need not be provided for each phase. Further, since almost all of the data bits are compared by the common comparator 52, only a simple constructed two-bit comparator need to be provided for each of the phases. Consequently, construction of the digital phase-shifting circuit can be simplified as a whole. To increase the precision of phase-shifting control, furthermore, the binary counter 50 and common digital comparator 52 having increased number of bits may be employed. Moreover, even when the phase-shifting circuit is to be adapted to multi-phase systems, the number of parts is small per phase. In other words, the digital phase-shifting circuit can be constructed requiring reduced number of parts.

What is claimed is:

1. A digital phase-shifting circuit for igniting sequentially plural thyristors connected across a polyphase power supply, comprising:
    (a) a first binary N bit counter triggered by clock signals with frequency of $2^N \times 6$ times that of said power supply,
    (b) a second counter composed of a divide-by-six ring counter triggered by a most significant bit signal of said first counter,
    (c) an N bit-first digital comparator for comparing a binary output signal consisting of N bits with less significant N bits of a phase reference signal consisting of N+2 bits and generating an output signal in the case where said binary output signal consisting of N bits is larger than said less significant N bits of said phase reference signal,
    (d) an exclusive OR circuit generating three types of phase signals having a binary 2 bit phase difference of every 60° from one another and effecting a repeating operation of 180° period by utilizing an output signal consisting of 3 bits derived from said second counter as the input,
    (e) a second digital comparator having three types of 2 bit constructions comparing phases with each other by utilizing more significant 2 bits selected from three types of binary output signals consisting of 2 bits generated from said exclusive OR circuit and said phase reference signal consisting of N+2 bits as the input signal, and
    (f) three same type pulse circuits functioning to correspond each output signal from said three types of second digital comparators having a different phase of every 60° from each other to each output signal from said second counter consisting of 3 bits by dividing separately said output signals with every 1 bit at the time when an output signal from said first digital comparator is applied to said second digital comparator as the input and generating two types of output pulse signals from binary signals consisting of the respective bits of said second counter, respectively.

2. A digital phase-shifting circuit as defined in claim 1 wherein said first and second counters are actuated by means of a PLL circuit to synchronize them with said AC power supply source.

3. A digital phase-shifting circuit as defined in claim 1 wherein a 2 bit signal is composed of a less significant bit and a more significant bit by combining two signals in the three types of output signals derived from said exclusive OR circuit, and three types of binary 2 bit output signals are generated, said binary 2 bit output signals being arranged such that a binary value "0" is obtained over a period of phase 0°-60°, a binary value "1" is obtained over a period of 60°-120° and a binary value "2" is obtained over a period of 120°-180° by means of the combination of said 2 bit output signals, and such operation in accordance with said arrangement generating a binary 2 bit signal repeating the same operation every 180° and two kind of binary 2 bit signals with phase difference of 60° each other.

4. A digital phase-shifting circuit as defined in claim 1 wherein a binary output signal consisting of 2 bits being composed of the output signals derived from said exclusive OR circuit is added to a more significant bit of the binary output consisting of N bits generated by said binary N bit-first counter to obtain a signal consisting of N+2 bits, and said second digital comparator is awaited until $2^N \times 3$ every 180° in response to output signals derived from said first comparator in which output signals generated by said first counter and said phase reference signal are utilized as the input whereby the output signals of said second counter are transmitted to one of the input terminals of said second digital comparator.

5. A digital phase-shifting circuit as defined in claim 1 wherein three types of output signals derived from said exclusive OR circuit are combined with each other as the operation for said digital comparator to compare a first signal consisting of three types of binary 2 bits differing the phases every 60° with a second signal consisting of binary 2 bits being more significant 2 bits of phase reference signals each consisting of N+2 bit with respect to those of said first signal, thereby to generate a logical output signal in either case where said first signal is higher than said second signal, or case where said first signal is equal to said second signal and an output signal is given by said first comparator.

6. A digital phase-shifting circuit as defined in claim 1 wherein a third output signal derived from a binary output consisting of N bits generated by said binary first counter is compared with a fourth signal consisting of less than N bits obtained by removing more significant 2 bits from N+2 bits of said phase reference signal, thereby to generate a logical output signal at the time when said third output signal exceeds said fourth output signal.

7. A digital phase-shifting circuit as defined in claim 1 wherein a part of said circuit is formed of a ROM with equivalent functions.

* * * * *

UNITED STATES PATENT AND TRADEMARK OFFICE
CERTIFICATE OF CORRECTION

PATENT NO. : 4,438,487
DATED : March 20, 1984
INVENTOR(S) : Jyoji Kawai

It is certified that error appears in the above-identified patent and that said Letters Patent is hereby corrected as shown below:

On the Abstract page, under "Foreign Application Priority Data" the number "56-169876" should read --56-130751--.

Column 4, line 21, "every after" should read --after every--.

Column 4, line 26, "Fig. 4(b) should read --Fig. 4(h)--.

Column 5, line 57, "circuits" should read --circuit--.

Signed and Sealed this

Second Day of October 1984

[SEAL]

Attest:

GERALD J. MOSSINGHOFF

Attesting Officer   Commissioner of Patents and Trademarks